United States Patent [19]
Intrater et al.

[11] Patent Number: 5,630,153
[45] Date of Patent: May 13, 1997

[54] INTEGRATED DIGITAL SIGNAL PROCESSOR/GENERAL PURPOSE CPU WITH SHARED INTERNAL MEMORY

[75] Inventors: Amos Intrater, Lantau, Hong Kong; Moshe Doron, Sunnyvale, Calif.; Gideon Intrater, Ramat-Gan; Lev Epstein, Holon, both of Israel; Maurice Valentaten, Geldtendorf, Germany; Israel Greiss, Raanana, Israel

[73] Assignee: National Semiconductor Corporation, Santa Clara, Calif.

[21] Appl. No.: 317,783

[22] Filed: Oct. 4, 1994

Related U.S. Application Data

[63] Continuation of Ser. No. 11,102, Jan. 29, 1993, abandoned, which is a continuation of Ser. No. 467,148, Jan. 18, 1990, abandoned.

[51] Int. Cl.⁶ .............................. G06F 9/26; G06F 9/40; G06F 9/44; G06F 13/36
[52] U.S. Cl. .......................... 395/800; 395/290; 395/306; 364/DIG. 1; 364/DIG. 2
[58] Field of Search ................................ 395/800, 290, 395/200.01, 375, 200.03, 700, 289, 287, 297, 2.79, 183.19, 2.55, 775, 306; 364/DIG. 1, DIG. 2, 706, 736, 726

[56] References Cited

U.S. PATENT DOCUMENTS

| | | | |
|---|---|---|---|
| 3,631,405 | 12/1971 | Hoff et al. | 395/650 |
| 4,276,594 | 6/1981 | Morley | 395/800 |
| 4,541,048 | 9/1985 | Propster et al. | 395/375 |
| 4,594,651 | 6/1986 | Jaswa et al. | 364/131 |
| 4,641,238 | 2/1987 | Kneib | 395/290 |
| 4,799,144 | 1/1989 | Parruck et al. | 364/200 |
| 4,811,345 | 3/1989 | Johnson | 395/183.03 |
| 4,860,191 | 8/1989 | Nomura et al. | 395/290 |

(List continued on next page.)

FOREIGN PATENT DOCUMENTS 299537  1/1989  European Pat. Off. .

OTHER PUBLICATIONS

MCS 8080/8085 Family User's Manual, Intel 1986, 5-1-19.
MCS 80/85 Family User's Manual, Intel Corporation, 1986, Chapter 5, The Instruction Set.
Electronic Design, Aug. 22, 1991, Microcontroller Eases Closed-Loop Servo Control, Dave Bursky, pp. 119–121.
National Semiconductor, Jan. 1990, NS32FX16–15/NS32FX-16–20/NS32FX16–25, High Performance FAX Processor.
Electronic Engineering Times, Aug. 26, 1991.; Ron Wilson: "Zilog Uses DSP for Disk Drive IC".
National Semiconductor, Jan. 11, 1989, KV96–X6D modem chip set.

(List continued on next page.)

*Primary Examiner*—Daniel H. Pan
*Attorney, Agent, or Firm*—Limbach & Limbach L.L.P.

[57] ABSTRACT

An integrated data processing platform for processing a digital signal that includes a general purpose processor and a digital signal processor (DSP) module. The DSP module recovers digital data from a digital signal utilizing a sequence of DSP operations selected by the general purpose processor. The general purpose processor processes the digital data recovered by the DSP module, but is also available to perform general purpose tasks. A shared internal memory array selectively provides information to the DSP module and to the general purpose processor. The information stored in the internal memory array includes operands utilized in the execution of the DSP algorithm and selected instructions and data utilized by the general purpose CPU either for controlling the execution of the DSP algorithm or for executing its own general purpose tasks. While in many applications the data processing system will include an analog front end that converts a modulated input signal received on an analog transmission channel to a corresponding digital signal for processing by the data processing system, the data processing system may also receive the digital signal directly from a digital source.

10 Claims, 8 Drawing Sheets

U.S. PATENT DOCUMENTS

| | | | |
|---|---|---|---|
| 4,862,407 | 8/1989 | Fette et al. | 395/800 |
| 4,876,660 | 10/1989 | Owen et al. | 364/754 |
| 4,908,825 | 3/1990 | Vea | 370/110.3 |
| 4,975,947 | 12/1990 | Chauvel | 379/334 |
| 4,991,169 | 2/1991 | Davis et al. | 370/77 |
| 5,005,168 | 4/1991 | Cummiskey et al. | 370/24 |
| 5,029,204 | 7/1991 | Shenoi et al. | 379/407 |
| 5,036,539 | 7/1991 | Wrench, Jr. et al. | 395/2.55 |
| 5,045,993 | 9/1991 | Murakami et al. | 395/375 |
| 5,111,530 | 5/1992 | Kutaragi et al. | 395/2.79 |
| 5,155,852 | 10/1992 | Murakami et al. | 395/725 |
| 5,185,599 | 2/1993 | Doornink et al. | 395/143 |
| 5,208,832 | 5/1993 | Greiss | 364/715.11 |
| 5,293,586 | 3/1994 | Yamazaki et al. | 395/164 |

OTHER PUBLICATIONS

"A Next-Generation 32 bit VLSI Signal Processor"; Shinjo Tsujimichi et al.; ICASSP 86, Tokio; 1986 IEEE; pp. 415-416.

Wescon Technical Papers, 30th Oct. 1984, pp. 4/3/1-7; Perlman: Bipolar and CMOS Technologies Become Partners in Dig. Sig. Processing.

IEEE Micro, vol. 6, No. 6, Dec. 1986, pp. 60-69; Eichen: "NEC'S mu PD77230 Digital Signal Processor".

Electronics, vol. 52, No. 26, Dec. 1979, pp. 109-115; Schirm: "Packing a signal processor onto a single digital board".

Texas Instruments, "TMS320C25 User's Guide Preliminary"; pp. 1/1-1/5, 2/1-2/21.

Doi et al., "A digital signal processor for modem applications", Electronic Engineer, Oct. 1989, pp. 198-204, 206.

Rockwell Preliminary Data Sheet, "R96DFX 9600bps Monofax Modem with Error Detection and DTMF Reception", Document #29200N60; Jul. 1989.

Yamaha Preliminary Data Sheet, "YM7109 MD96FX (9600bps Fax Modem LSI)", Catalog No.:LSI.

Reiner, et al.; "VLSI Development of a Global Memory Interface Controller"; pp. 0254-0257 (7.8.1.-7.8.4.); IEEE 1990.

Ruby B. Lee; "HP Precision: A Spectrum Architecture"; pp. 242-251; IEEE 1989.

Sorin Iacobovici; "A Pipelined Interface for High Floating-Point Performance with Precise Exceptions"; pp. 77-87; IEEE 1988.

Fotland et al.; "Hardware Design of the First HP Precision Architecture Computers"; pp. 4-17; Hewlett Packard Journal Mar., 1987.

R. Haines: "Two muCs on one chip split the silicon and the work": Electronic Design, vol. 29, No. 10, May 1981, pp. 197-202, Waseca, US.

L. Vieira et al.: "A multiprocessing system for the TMS32020": Microprocessing and Microprogramming: vol. 23, nos. 1-5, Mar. 1988, pp. 221-225 Amsterdam, NL.

M.C. Ertem: "A reconfigurable co-processor for microprocessor systems": Conference Proceedings of the IEEE Sourtheastcon '87:Tampa, Florida, 5th-8th, Apr. 1987, fol. 1, pp. 225-228, IEEE.

M. Homewood et al.: "The IMS T800 transputer": IEEE Micro, vol. 7, No. 5, Oct. 1987, pp. 10-26.

J.R. Schweitzer: "Design implementation and analysis of a modular digital signal processing system": 5th International Conference on Systems Engineering: Fairborn, Ohio, 9th-11th; Sep. 1987, pp. 447-450, IEEE, New York, US.

M.L. Fuccio et al: "The DSP32C: AT&T's second-generation floating-point digital signal processor": IEEE Micro, vol. 8, No. 6, Dec. 1988, pp. 30-47, IEEE, New York, US.

| INSTRUCTION | OPC1 | OPC0 | CLR | COJ | OPERATION | CYCLES |
|---|---|---|---|---|---|---|
| VCMAD | 0 | 0 | 0 | 0 | C[i] <= C[i]+YxD[i] | 9+(Nx8) |
|  | 0 | 0 | 0 | 1 | C[i] <= C[i]+YxD[i]* |  |
|  | 0 | 0 | 1 | 0 | C[i] <= YxD[i] |  |
|  | 0 | 0 | 1 | 1 | C[i] <= YxD[i]* |  |
| VCMUL | 0 | 1 | 0 | 0 | C[i] <= C[i]x(1+D[i]) | 9+(Nx8) |
|  | 0 | 1 | 0 | 1 | C[i] <= C[i]x(1+D[i]*) |  |
|  | 0 | 1 | 1 | 0 | C[i] <= C[i]xD[i] |  |
|  | 0 | 1 | 1 | 1 | C[i] <= C[i]xD[i]* |  |
| VCMAC | 1 | 0 | 0 | 0 | A <= A + SIGMA(C[i]xD[i]) | 6+(Nx8) |
|  | 1 | 0 | 0 | 1 | A <= A + SIGMA(C[i]xD[i]*) |  |
|  | 1 | 0 | 1 | 0 | A <= SIGMA(C[i]xD[i]) |  |
|  | 1 | 0 | 1 | 1 | A <= SIGMA(C[i]xD[i]*) |  |
| VCMAG | 1 | 1 | 0 | 0 | A <= A + SIGMA(C[i]xC[i]) | 5+(Nx8) |
|  | 1 | 1 | 0 | 1 | A <= A + SIGMA(C[i]xC[i]*) |  |
|  | 1 | 1 | 1 | 0 | A <= SIGMA(C[i]xC[i]) |  |
|  | 1 | 1 | 1 | 1 | A <= SIGMA(C[i]xC[i]*) |  |

FIG. 7

| DS1 | DS0 | EXTERNAL BUFFER SIZE (DM) | CONSTANT ADDRESS BITS | INCREMENTED ADDRESS BITS |
|---|---|---|---|---|
| 0 | 0 | 8 | A0, A5 – A23 | A1 – A4 |
| 0 | 1 | 16 | A0, A6 – A23 | A1 – A5 |
| 1 | 0 | 32 | A0, A7 – A23 | A1 – A6 |
| 1 | 1 | 64 | A0, A8 – A23 | A1 – A7 |

INTEGRATED DIGITAL SIGNAL PROCESSOR/GENERAL PURPOSE CPU WITH SHARED INTERNAL MEMORY

This is a continuation of application Ser. No. 08/011,102 filed on Jan. 29, 1993, now abandoned, which is a continuation of application Ser. No. 07/467,148 filed on Jan. 18, 1990 now abandoned.

BACKGROUND OF THE INVENTION

1. Field of the Invention

The present invention relates generally to data processing systems and, in particular, to a processing platform that provides integrated general purpose and digital signal processing (DSP) capabilities for recovering and processing digital data utilizing an internal shared memory resource.

2. Discussion of the Prior Art

The basic function of any communications system is to transmit information over a communication channel from an information source to a destination as fast and as accurately as possible.

There are two general types of information sources. Analog sources, such as a telephone microphone, generate a continuous signal. Digital sources, such as a digital data processing system, generate a signal that consists of a sequence of pulses.

Communications channels that are designed to transmit analog signals (e.g., the telephone network) have characteristics which make it difficult for them to transmit digital signals. To permit the transmission of digital pulse streams over an analog channel, it is necessary to utilize the digital data pulses to modulate a carrier waveform that is compatible with the analog transmission channel.

The equipment that performs the required modulation is generally referred to as a "MODEM". The term "MODEM" is an acronym for MOdulator-DEModulator, since one piece of equipment typically includes the capability not only to modulate transmitted signals, but also to demodulate received signals to recover the digital data from the modulated analog carrier waveform.

While passing through the transmission channel, the modulated carrier waveform suffers from distortion introduced both by the system itself and by noise contamination. Thus, one of the tasks of the modem's demodulation function is to filter the signal received from the transmission channel to improve the signal-to-noise ratio. The demodulator also retrieves timing information from the received signal to provide sampling points for recovering the digital data. The demodulator may also condition the data in other ways to make it suitable for additional processing.

In a conventional modem, the signal filtering, sampling and conditioning tasks are performed by three functional units: analog-to-digital conversion circuitry ("analog front end") that converts the received modulated carrier waveform to a digitized replica, a digital signal processor (DSP) that recovers the digital data from the digitized replica, and a control function for controlling both the analog front end and the digital signal processor. The digital signal processor recovers the data by implementing a signal conditioning and data recovery algorithm that is specific to the type of data being received.

For example, the digital signal processor function in a facsimile (fax) machine modem implements a special purpose algorithm that can only be used for recovering digital fax data. In the case of a fax system, the data to be recovered is a digital bit map that corresponds to the transmitted hard copy image and which has been compressed to facilitate efficient transmission. The algorithm implemented by the digital signal processor function of the receiving fax machine's modem is a dedicated "fax" algorithm that has been designed specifically for accurately recovering the compressed bit map. It cannot recover digital data in a format other than a compressed bit map, e.g. voice mail data or data modem applications. A different digital signal processor implementing a different dedicated "voice mail" or "data modem" algorithm is needed for each of these other applications.

Figure 1:
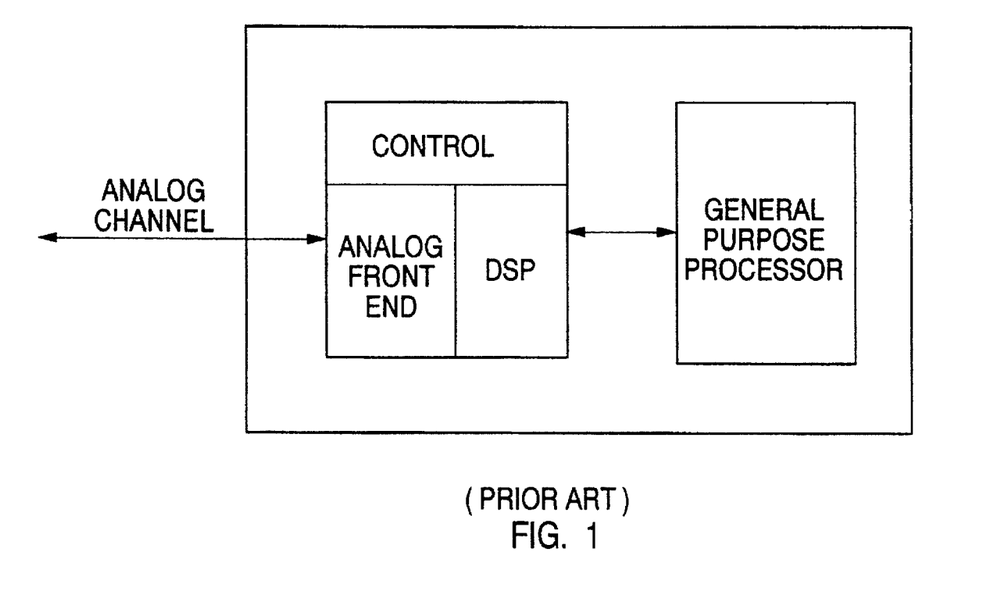
FIG. 1 is a block diagram illustrating the basic functional partitioning of a conventional facsimile system.

As shown in FIG. 1, a conventional fax machine architecture may be partitioned into two major functional blocks: (1) a special purpose fax modem block of the type described above for recovering a compressed bit map from a modulated carrier waveform and (2) a general purpose processor block for performing those tasks require to convert the compressed bit map to a corresponding hard copy image.

A well known example of a special purpose fax modem block is the Rockwell R96DFX MONOFAX® modem chip, the so-called "Rockwell Module". In the Rockwell Module, the incoming modulated carrier waveform received from an analog channel, i.e., a telephone line, is processed by an analog front end which generates a digitized replica of the analog signal; that is, the analog front end generates a digital reading of the input voltage level. A dedicated fax digital signal processor then performs the adaptive filtering, signal sampling, synchronization and carrier phase/frequency tracking required to reconstruct the compressed facsimile bit map from the digitized replica provided by the analog front end. The recovered bit map is then provided to the general purpose processor block which performs the additional processing functions required for printing the transmitted image. That is, the general purpose processor block controls and performs the data decompression, decoding, imaging and printing functions necessary to generate a hard copy reconstruction of the recovered bit map.

To transmit an image, the fax machine shown in FIG. 1 performs the above-described steps in reverse order. The general purpose processor block controls and performs the conversion of the hard copy image to a corresponding compressed bit map. The compressed bit map is then provided to the special purpose fax modem block which utilizes the bit map to modulate a carrier waveform which is transmitted over the analog channel to a destination fax machine.

A modem architecture similar to that of the Rockwell Module is also provided by the Yamaha YM7109 FAX modem LSI chip.

The fax machine architecture exemplified by the Rockwell Module and the Yamaha modem chip, that is, a special purpose fax modem block in combination with a separate general purpose processor block, suffers from a number of disadvantages. First, the system requires two separate processor functions: the special purpose DSP function of the modem block for recovering the compressed bit map and the general purpose processing and control functions of the general purpose processor block for performing the remaining tasks required to convert the compressed bit map to hard copy. Since there are periods of time when no facsimile transmissions are being received, the system's full processing capability is greatly underutilized. Furthermore, the DSP functions of the modem block are dedicated to a particular application, in this case, facsimile reception/transmission. That is, as stated above, the DSP algorithm utilized to recover the incoming data is fixed; aside from the ability to modify the coefficients of the "fax" algorithm, there is no flexibility in the modem algorithm to allow it to perform tasks other than facsimile data recovery. This results in a high-cost, application-specific system architecture with redundant processing capabilities.

A variation in the Rockwell and Yamaha modem architectures is exemplified by the OKI KV96-X6D modem chip set. While the architecture of the OKI modem chip set maintains the separate modem and general purpose processor functions of the Rockwell and Yamaha modems described above, its analog front end and DSP functions are also separated. Since the DSP function is programmable, some flexibility in the type of signal that may be processed is permitted. However, once programmed, the DSP function of the OKI modem still relies on a fixed DSP algorithm. Thus, the OKI architecture has the same basic limitations and inefficiencies as the Rockwell and Yamaha devices.

The Texas Instruments TMS320C25 Digital Signal Processor provides a "general purpose" DSP capability in that it can accommodate a number of DSP algorithmic sequences. However, it relies on dedicated memory for storage of its DSP operations and data. Thus, it must incorporate its own segregated control capability aside from that provided by the general purpose processor with which it is associated.

NEC IC Microsystems Ltd. provides a modem DSP chip that includes a DSP core that is integrated with a general purpose processor block. However, the DSP core of the NEC device is dedicated to a particular algorithm and relies on its own control functions and an internal memory separate from that of the general purpose processor function for storage and retrieval of its operands. Furthermore, the general purpose processor function is fully embedded, making it unavailable for tasks other than those related to the dedicated DSP function.

It would, therefore, be desirable to have available a dual processor platform that can execute a variety of DSP algorithms while maintaining full general purpose processor capability.

SUMMARY OF THE INVENTION

The present invention provides a data processing system that utilizes integrate general purpose processor (GPP) and digital signal processor (DSP) functions that are connected for common access to an internal shared memory array. The shared memory array stores the operands for a set of basic DSP operations that can be executed by the DSP function. The sequence of DSP operations to be executed by the DSP function is selectively configurable by the GPP function; that is, the general purpose processor can define a variety of DSP algorithms that can be executed by the DSP function for processing different digital input signal formats. In addition to storing the operands required by the DSP function for execution of a DSP algorithm, the internal shared memory array also stores selected instructions and data required by the GPP function for execution of general purpose tasks. The operands, insructions and data may be selectively loaded to the internal shared memory array from system memory. After execution of a DSP algorithm, the corresponding information set may be down-loaded from the internal memory array to system memory and a new information set retrieved for execution of a subsequent DSP algorithm or a new general purpose processor task.

Thus, in accordance with the principles of the present invention, the general purpose processor selects a DSP algorithm for conditioning and recovering digital data from the incoming signal. That is, the GPP selects from the set of basic DSP operations to define a specific sequence of DSP operations appropriate for processing the incoming signal. The GPP then retrieves operands required for execution of the selected DSP algorithm and/or instructions and data critical to the GPP for controlling the DSP function or for performing GPP tasks and loads them into the internal shared memory array. Next, the GPP invokes the first DSP operation in the selected sequence and the DSP function performs the DSP operation utilizing operands retrieved by the DSP function from both the shared memory array and system memory. Upon completion of the DSP operation by the DSP function, the GPP function either reads the result of the DSP operation, invokes the next DSP operation in the selected sequence or performs a GPP task. This process continues until the selected sequence of DSP operations has been executed by the DSP function. The GPP may then download from the internal shared memory array the operands, instructions and data utilized in executing the selected DSP algorithm and either identify and execute a subsequent DSP algorithm fashioned from the set of basic DSP operations or retrieve instructions and data required for a separate GPP task.

While the input signal to the data processing system may be received directly from a digital source, a preferred embodiment of the invention includes an analog front end that converts a modulated input signal received on an analog channel to a corresponding digital signal for processing by the data processing system.

Thus, a data processing system in accordance with the present invention provides a unique system partitioning by integrating a small DSP module and a general purpose processor. This unique partitioning provides a single processor solution for both DSP and general purpose computations that can utilize the same programming mode and the same system development tools for both functions. The DSP module provides the capability necessary to handle a variety of DSP requirements. The internal shared memory allows the DSP algorithms to be tuned or changed or new algorithms to be added to meet changing, expanding system requirements; general purpose computation intensive tasks can also be executed directly from the internal shared memory.

A better understanding of the features and advantages of the present invention may be obtained by reference to the following detailed description of the invention and accompanying drawings which set forth an illustrative embodiment in which the principles of the invention are utilized.

DETAILED DESCRIPTION OF THE INVENTION

Figure 2:
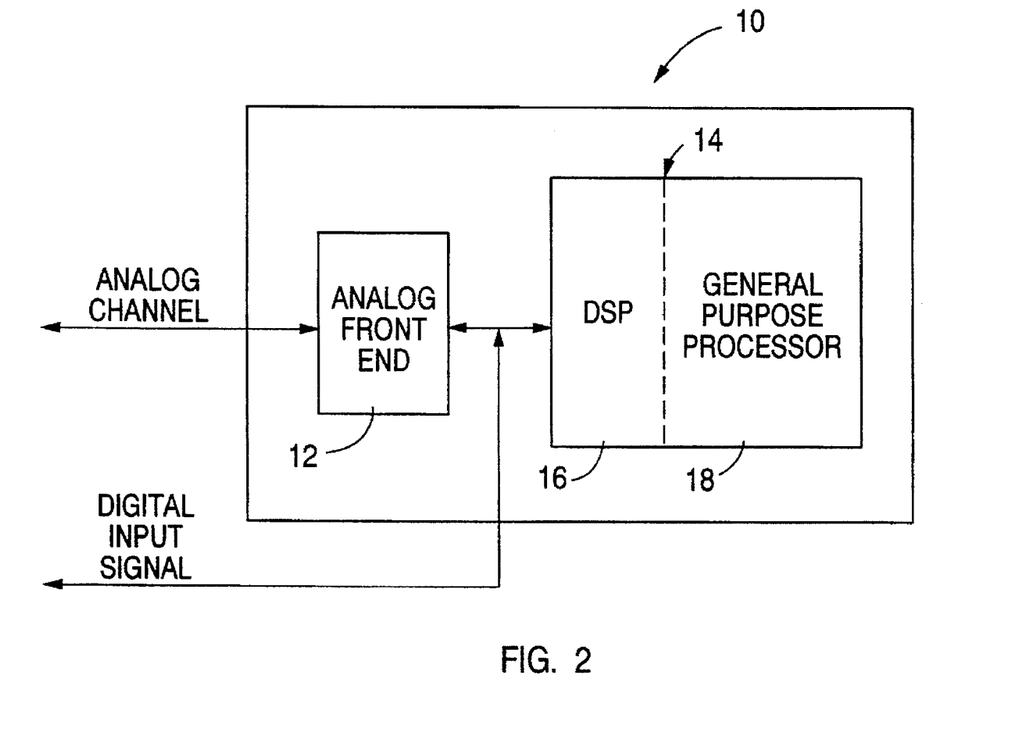
FIG. 2 is a block diagram illustrating the basic functional partitioning of a data processing system in accordance with the present invention.

FIG. 2 shows a data processing system 10 which is uniquely partitioned in accordance with the concepts of the present invention. The data processing system 10 is described below in the context of the requirements of a facsimile system. However, it will be understood by those skilled in the art that the principles of the invention are applicable to any system which receives an incoming data signal that requires digital signal processing.

The data processing system 10 shown in FIG. 2 includes two primary functional elements: an analog front end 12 and an integrated processing platform 14. The integrated processing platform 14 includes both a digital signal processor (DSP) module 16 and a general purpose processor (GPP) 18.

The analog front end 12 converts a modulated input signal received from an analog transmission channel, e.g. a telephone line, to a digitized replica of the modulated input signal. The analog front end 12 can be implemented utilizing conventional, off-the-shelf integrated circuit products available for this purpose.

As stated above, the integrated processor platform 14 includes a DSP module 16 that recovers digital data from the digital signal generated by the analog front end 12. The DSP module 16 includes a processing mechanism, described in greater detail below, that conditions the digital signal utilizing an algorithm comprising a selected sequence of DSP operations.

The general purpose processor 18 controls the DSP module 16 and processes the digital data generated by the DSP module 16 to a desired end result. The general purpose processor 18 may be any conventional state-of-the-art microprocessor.

As further shown in FIG. 2, while in many applications, the analog front end 12 will be utilized to convert a modulated input signal received on an analog channel to a corresponding digital signal, there are a growing number of applications (e.g., ISDN and T1) in which a digital input signal will be received by the integrated processor platform 14 directly from a digital source.

Figure 3:
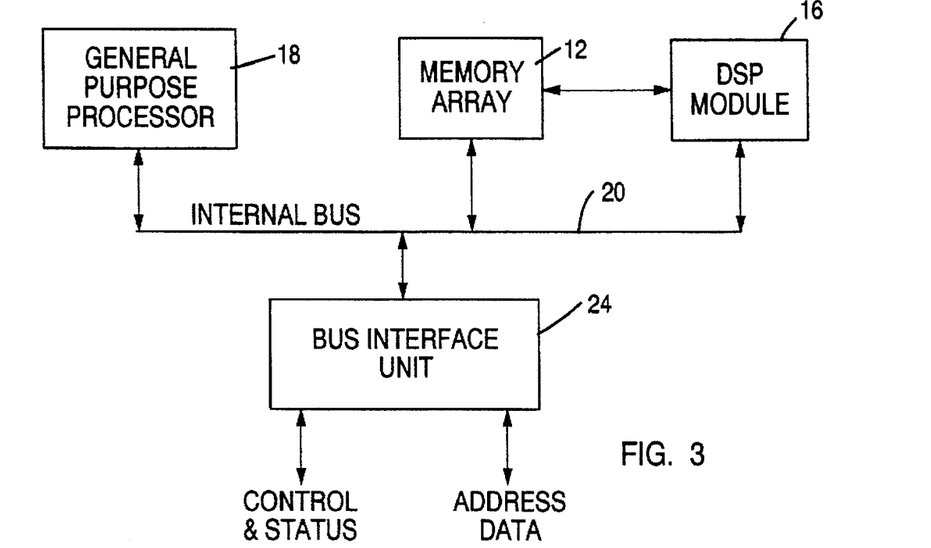
FIG. 3 is a block diagram illustrating the primary functional units of a data processing system in accordance with the present invention.

Referring to FIG. 3, both the DSP module 16 and the general purpose processor 18 are connected to an internal bus 20, allowing both the DSP module 16 and the general purpose processor 18 to communicate with a system memory (not shown) via a conventional bus interface unit 24 for transfer of control/status information and addresses/data therebetween. It will be understood by those skilled in the art that the internal bus 20 comprises both an internal address bus for handling address references by the DSP module 16 and the general purpose processor 18 and an internal data bus for handling instruction and data transfers.

To save bus bandwidth, the DSP module 16 stores operands used in executing DSP algorithms in an internal RAM memory array 22 which, as will be described in greater detail below, is also accessible to general purpose processor 18. That is, in accordance with the concepts of the present invention, the internal memory array 22 serves as a shared resource for both the DSP module 16 and the general purpose processor 18. In the illustrated embodiment, the internal memory is shown as accessible by the DSP module 16 and the general purpose processor 18 via the internal bus 20. It will be understood by those skilled in the art that other bus structures would also provide the desired shared accessibility to the internal memory array 22; for example, the internal memory array 22 could be implemented as a dual port memory.

As described in greater detail below, the DSP module 16 may fetch operands in parallel from the internal memory array 22 and system memory.

The DSP module 16 executes vector operations on complex variables that are optimized for DSP applications. The general purpose processor 18 treats the DSP module 16 as a memory mapped I/O device that occupies a reserved memory space, interfacing with the DSP module 16 via a set of memory mapped registers.

Figure 4:
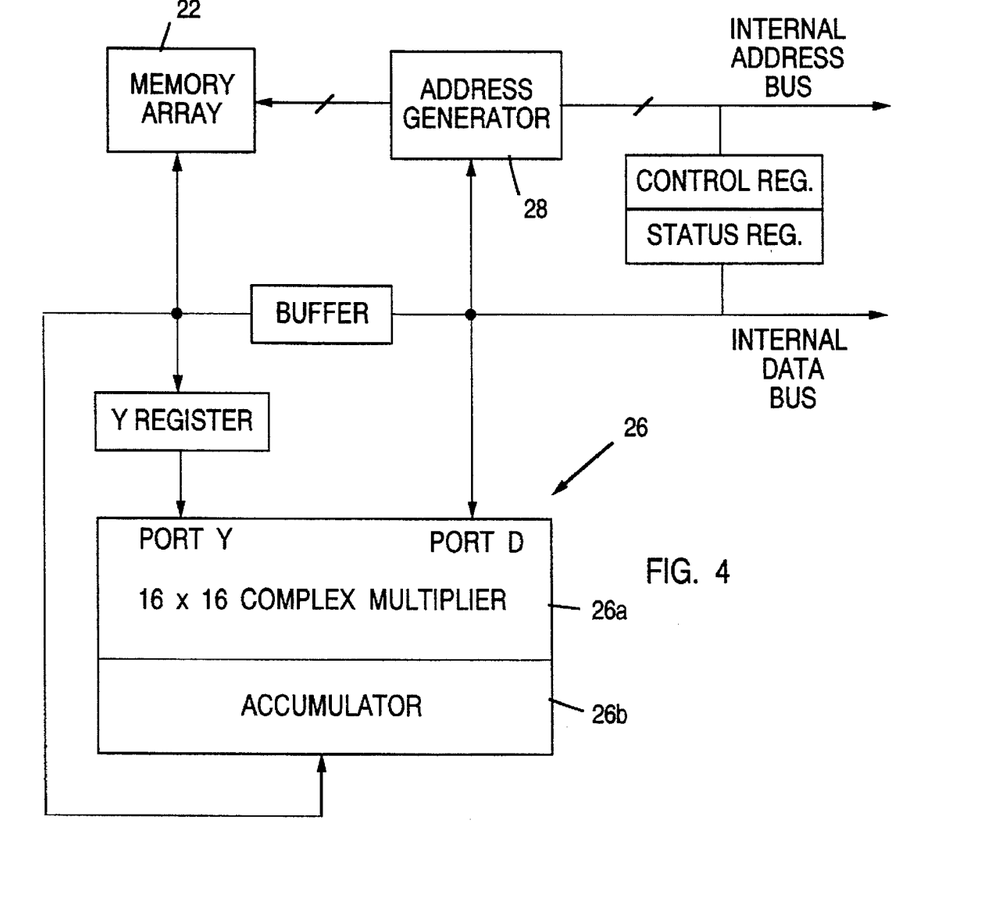
FIG. 4 is a block diagram illustrating a DSP module utilizable in a data processing system in accordance with the present invention.

As shown in FIG. 4, high performance is achieved in the DSP module 16 by using the internal shared memory array 22 as well as a multiplier/accumulator 26. The DSP module also includes its own internal address generator 28 for system memory and internal operand accesses, thus reducing the load on the general purpose processor 18. Both the multiplier/accumulator 26 and the address generator 28 are conventional implementations.

In the operation of the data processing system 10, the general purpose processor 18 selects from a basic set of DSP operations to define a specific sequence of operations as the DSP algorithm to be executed by the DSP module 16 for recovering data from the incoming digital signal. The general purpose processor then retrieves operands required for execution of the selected DSP algorithm and/or instructions and data critical to the general purpose processor for controlling the DSP module 16 or for performing general purpose tasks and loads them into the internal RAM array 22. The general purpose processor then invokes the first DSP operation in the selected sequence by issuing the corresponding command to the control register of the DSP module 16. The DSP module then places the general purpose processor 18 in a continuous wait state while it performs the first DSP operation utilizing operands retrieved by the address generator 28 from the RAM array 22 and system memory. Upon completion of the DSP operation, the DSP module cancels the continuous wait state and the general purpose processor 18 then either reads the status of the DSP module 16 or the result of the DSP operation or carries on with the execution of its normal program flow, which may be either invoking the next DSP operation in the selected sequence by issuing the appropriate command to the DSP module control register or performance of a general purpose task. This process continues until the selected sequence of DSP operations has been completed. The general purpose processor may then download the contents of the shared internal RAM array 22 and retrieve a new set of operands, instructions and data for further DSP operations or general purpose processing tasks.

As further shown in FIG. 4, the DSP module 16 performs complex arithmetic calculations on two vector operands provided to the multiplier/accumulator 26 at Port Y and Port D. One vector is retrieved from the internal memory array 22. The other vector is either organized as a circular buffer in the system memory (described in greater detail below) or retrieved from the internal memory array 22.

The DSP module 16 executes vector operations in a two stage pipeline. This allows for a significant performance enhancement as the fetch and execution of operands for consecutive vector elements are performed simultaneously rather than in a strictly sequential manner. The DSP module 16 can fetch up to two data elements at a time, using its address generator 28 for system memory access and the internal array 22 for the second operand. While fetching operands for one vector element, the DSP module 16 performs the multiply and add operations on the previous vector element.

Figure 5:
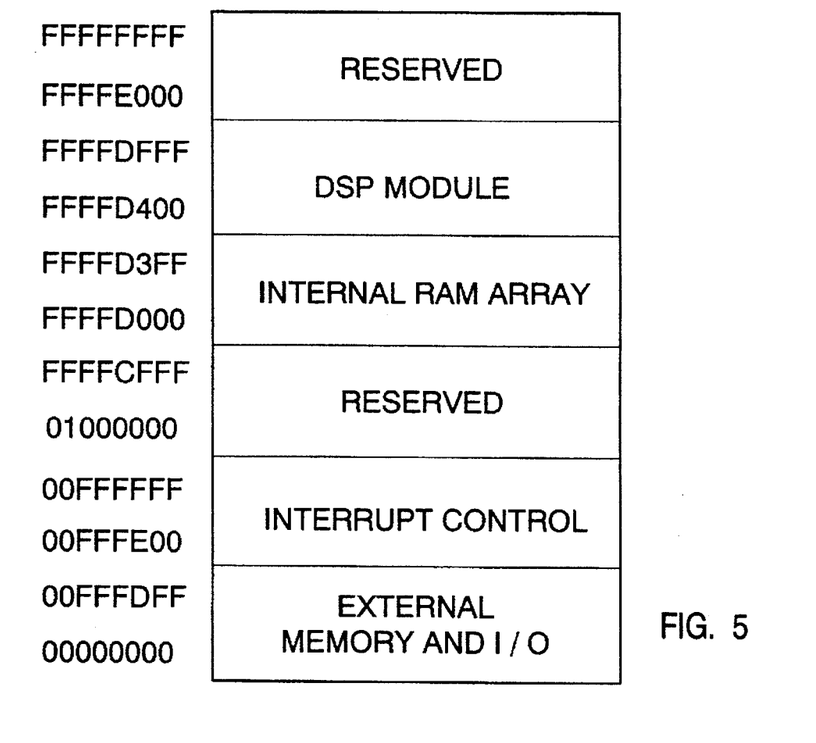
FIG. 5 illustrates the general purpose processor address mapping of a data processing system in accordance with the present invention.

The DSP module 16 contains seven registers in addition to the RAM array 22. These registers, as well as the internal memory array 22, are accessed by the general purpose processor 18 as memory-mapped I/O devices. As shown in FIG. 5, their associated addresses reside in the upper part of a 32-bit address range of general purpose processor 18. External memory locations are specified by the lower 24 address bits and mapped to the lower 16 megabyte of this address range.

Referring back to FIG. 4, the multiplier input register Y is a 32-bit register that holds one complex operand. The multiplier input register Y is mapped into two consecutive words called Y0 and Y1.

The accumulator register A is a 32-bit register that holds one complex result. The A register is mapped into consecutive words, also called A0 and A1. Internally, A0 and A1 are 32-bit registers. However, only bits 15–30 (i.e., 16 bits) are visible. The rest of the bits are used for a higher dynamic range and intermediate calculations.

A 24-bit pointer to the beginning of the data vector in the external system memory is provided by data pointer register DPTR. In order to implement circular buffers, only the less significant bits of the DPTR pointer are incremented. When the end of a buffer is reached, the least significant bits of the DPTR pointer are reloaded with zeroes. The number of bits that are set to zero, which defines the size of the circular buffer, is controlled by a Control Register CTL, which is described below. The least significant word of the DPTR pointer is called DPTR0 and the most significant byte is called DPTR1.

The CPTR register holds the address and length of the coefficient vector.

| 15 | | | | | | | | 8 | 7 | | | | | | | 0 |
|---|---|---|---|---|---|---|---|---|---|---|---|---|---|---|---|---|
| 0 | L6 | L5 | L4 | L3 | L2 | L1 | L0 | 0 | S6 | S5 | S4 | S3 | S2 | S1 | S0 |

S0–S6 Start Address of coefficient's vector
    (number of C reg.)

L0–L6 Length of coefficient' vector
    (in double words).

Any reference by general purpose processor 18 to the registers of the DSP module 16 or to the internal memory array 22 is done using a bus protocol for internal control register access to enable external observability. This protocol is more fully described in commonly-assigned U.S. patent application Ser. No. 07/750,771, filed Aug. 8, 1991, now U.S. Pat. No. 5,212,775, which is a continuation of U.S. patent appliction Ser. No. 07/461,023, filed Jan. 4, 1990, by Zeev Bikowsky and Dan Biran, titled METHOD AND APPARATUS FOR OBSERVING MEMORY-MAPPED REGISTERS, now abandoned; the just-referenced Bikowsky/Biran application is hereby incorporated by reference to provide additional background information regarding the present invention.

Each storage location in the internal memory array 22 is 32 bits wide and holds one complex number.

As stated above, the internal memory array 22 is not limited to storage of filtering coefficients for a specific DSP algorithm. It can also be used as a fast, zero-wait state, integrated memory for storing instructions and data utilized by the general purpose processor 18 as well as for storing selected operands for use by the DSP module 16 for processing a variety of data signal formats.

The memory array 22 can be used for instruction fetches with only one restriction: instructions must be loaded into the array 22 using word aligned accesses. This can be achieved by moving the aligned double-word from system memory to memory array 22. Data can also be stored in the memory array 22 with one restriction: storing data in the array 22 can be done only if all the data is written using aligned word or double-word accesses.

The Control Register CTL controls the various modes of operation of the data processing system 10.

| 7 | | | | | | | 0 |
|---|---|---|---|---|---|---|---|
| OPC1 | OPC0 | DS1 | DS0 | X | X | CLR | COJ |

OPC1-0 Operation code.
  00    VCMAD Vector Complex Multiply Add
  01    VCMUL Vector Complex Multiply
  10    VCMAC Vector Complex Multiply Accumulate
  11    VCMAG Vector Complex Magnitude
DS0–DS1 Data Buffer Size.
  00    8 double-words
  01    16 double-words
  10    32 double-words
  11    64 double-words
CLR Clear Accumulator (A0 and A1) before
    beginning the operation.
COJ Conjugate when set to 1, the value of the
    operand in Port D of the multiplier will be
    conjugated prior to multiplication.

The Status Register ST holds the status of the last vector operation.

| 7 | | | | | | | 0 |
|---|---|---|---|---|---|---|---|
| OVF | X | X | X | X | X | OP1 | OP0 |

OP0 Overflow occurred on calculation of A0.
OP1 Overflow occurred on calculation of A1.

The ST register is cleared to 0 in the following cases:
the user writes directly to either A0 or A1.
the user writes to the CTL register upon reset.

The operation of the DSP module 16 will now be described in greater detail; the following terms will be used in the operational description:

| | |
|---|---|
| C[i] | an entry in internal memory array 22, entry [i] can be selected by address generator 28 or directly accessed by CPU 18; |
| D[i] | Data from system memory fetched using address generator 28; |
| Y | Complex Multiplier input register 30 in FIG. 4; |
| D[i]* | The conjugate of D[i]; |
| A | Complex Accumulator register. |

The DSP module 16 executes the following six basic commands:

| | |
|---|---|
| VCMAC | Vector Complex Multiply Accumulate |
| VCMAG | Vector Complex Magnitude |
| VCMAD | Vector Complex Multiply Add |
| VCMUL | Vector Complex Multiply |
| LOAD | Write into C, Y, A or CTL |
| STORE | Read from C, Y, A, ST or CTL |

The VCMAC, VCMAD and VCMUL commands use the following parameters:

| | |
|---|---|
| D | Vector Start Address in system memory |
| C | Vector Start Address in internal RAM |
| | Vector Length |
| | Control bits |

The VCMAG command uses only the last three operands.

Complex numbers are organized in the internal memory array 22 as double words. Each double word contains two 16-bit 2's complement fractional integers. The less significant word contains the Real part of the number. The most significant word contains the Imaginary part of the number.

Figure 6:
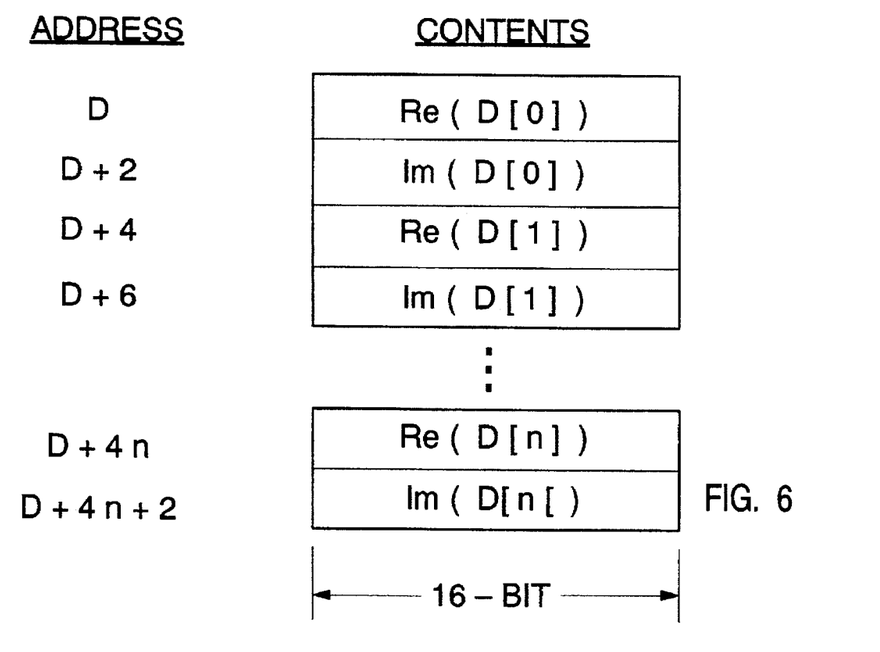
FIG. 6 is a table illustrating the memory organization of a complex vector for use in a DSP module in accordance with the present invention, FIG. 7 provides an instruction set summary for a DSP module in accordance with the present invention.

The complex vectors utilized by the DSP module 16 consist of arrays of complex numbers stored in consecutive addresses. Complex vectors must be aligned to double word boundary. FIG. 6 illustrates the memory organization of a vector D.

Referring back to FIG. 4, the arithmetic logic unit 26 of the DSP module 16 contains a 16×16 multiplier 26a and a 32-bit adder/accumulator 26b. Bits 15–30 (16 bits) of the result are rounded and can be read by accessing the A register. If an overflow is detected during an operation, the Status Register (ST) overflow bit and either the OP0 bit or the OP1 bit is set to "1."

When data is loaded into the adder/accumulator 26b, the 16 bits of data are loaded into bits 15–30, the lower bits are set to "0", while bit 31 gets the same value as bit 30 (sign extended). An overflow is detected whenever the value of bit 30 is different from the value of bit 31.

Each basic DSP operation or instruction to be performed by the DSP module 16 is controlled by two OP-code bits (OPC0 and OPC1) and two specifiers (COJ and CLR). COJ specifies whether the operand on port D of the multiplier 26a must be conjugated prior to multiplication. The CLR bit is used to extend the instruction set. On VCMAC and VCMAG, CLR specifies whether the accumulator 26b must be cleared at the beginning of the vector operation. On VCMAD, CLR specifies that the operation will ignore the value of C[i]. In VCMUL, CLR indicates that the value of D[i] is to be taken instead of 1+D[i].

Figure 7:
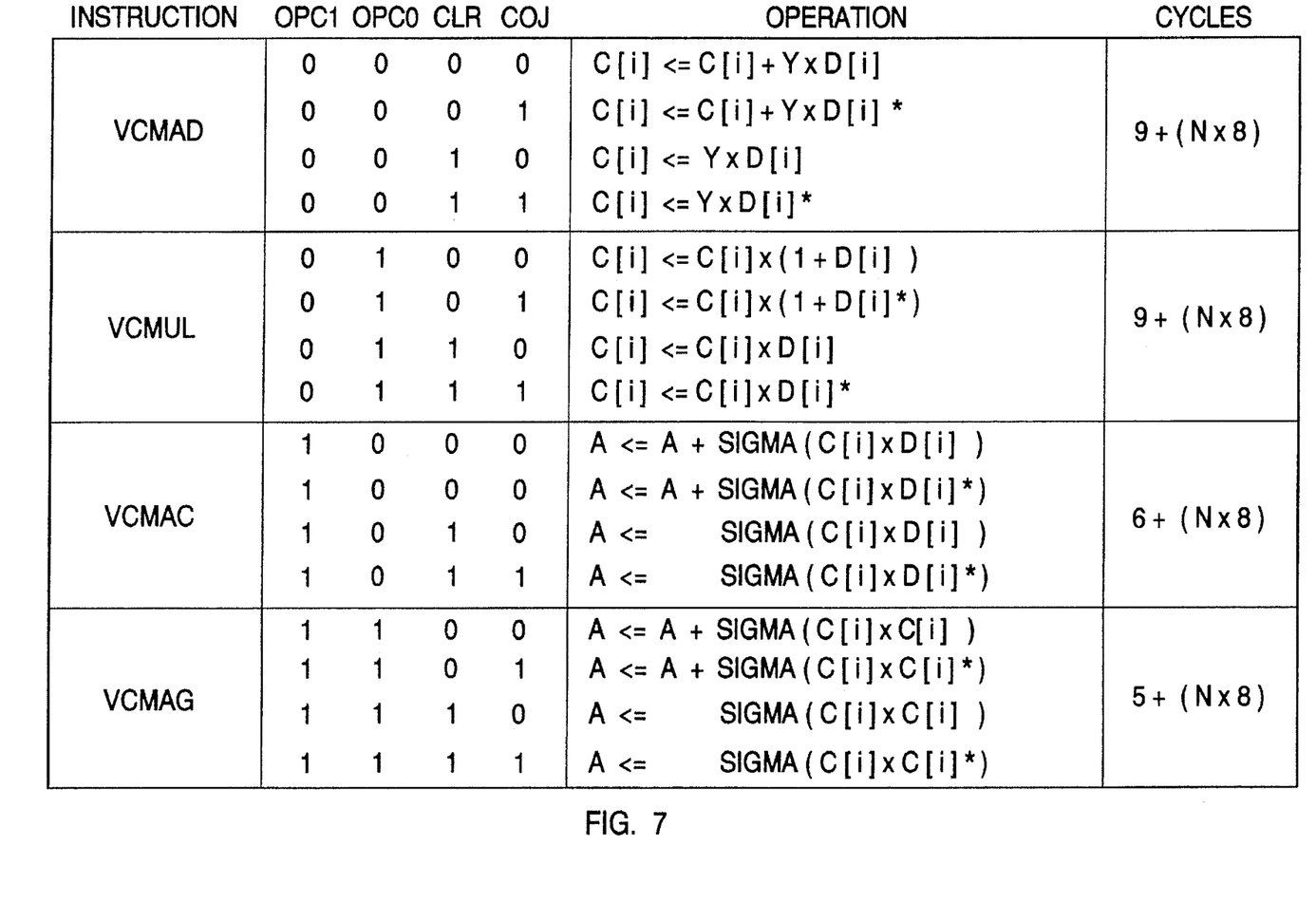

FIG. 7 provides a summary of the set of basic DSP operations executed by the DSP module 16 as a function of the OPC1, OPC0, COJ, and CLR bits in the CTL register. In FIG. 7, "SIGMA" represents the summation sign:

$$\sum_{i=1}^{M}$$

All the operands are complex numbers. Thus, A=SIGMA C[i]×D[i] breaks down to:

$$Re(A)=\text{Sigma}\{Re(C[i])\times Re(D[i])+Im(C[i])\times Im(D[i])\}$$

$$Im(A)=\text{Sigma}\{Re(C[i])\times Im(D[i])+Im(C[i])\times Re(D[i])\}$$

The accumulator 26b, the multiplier input register Y, the external data pointer DPTR and the coefficient pointer CPTR registers are used as temporary registers during vector operations. Values stored in these register prior to activation of the DSP module 16 are destroyed. If the content of the accumulator register A after an operation of the DSP module 16 is used as an initial value for the next operation, it must be remembered that the least significant bits of (0/14) may contain a value of other than zero.

Figure 8:
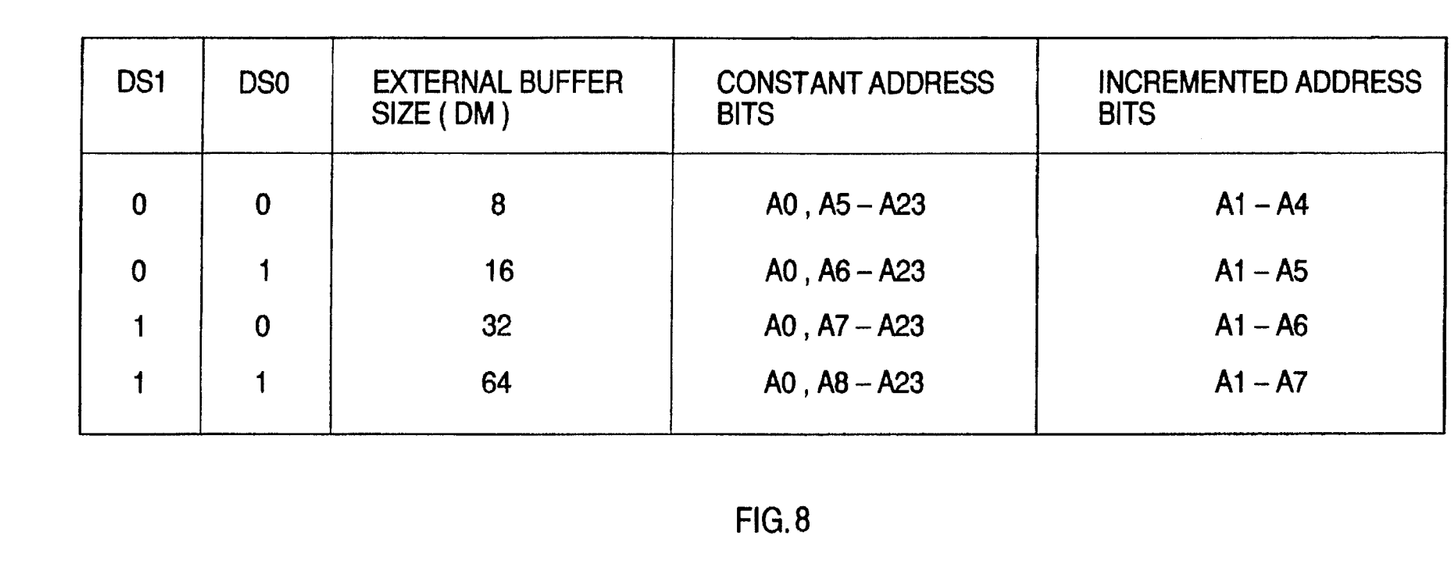
FIG. 8 is a table illustrating the handling of cyclic buffers for a DSP module in accordance with the present invention.

As stated above, the DSP module 16 accesses arrays of data in external memory using the DPTR pointer as an address. The DS0 and DS1 bits of the CTL register control the size of the array. The DSP module 16 allows a convenient way of handling data arrays as a FIFO. Only the appropriate number of the least significant bits of the DPTR are incremented on each access. The upper bits remain constant. FIG. 8 shows which bits are incremented. The rest remain constant.

Figure 9A:
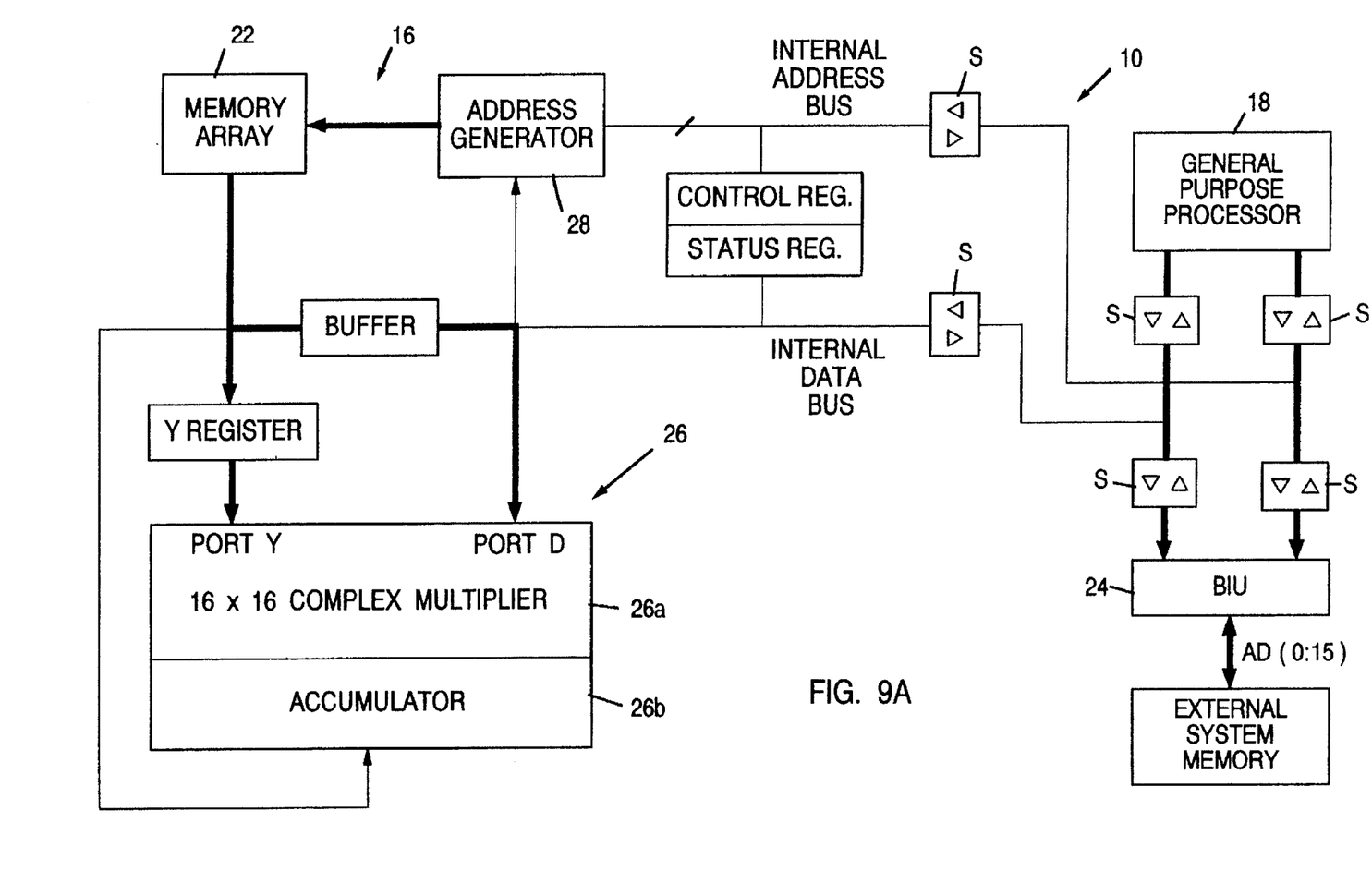
FIG. 9A is a block diagram illustrating an internal bus configuration of a data processing system in accordance with the present invention with the DSP module executing a VCMAG command.

FIG. 9A illustrates the operation of the data processing system 10 with the DSP module 16 executing the VCMAG command while the general purpose processor 18 executes a general purpose task.

As shown in FIG. 9A, bidirectional switches S that are responsive to control signals provided by the general purpose processor 18 are located on the internal bus 20 so as to permit configuration of a variety of communications paths among the DSP module 16, the general purpose processor 18 and the bus interface unit 24 (which, as stated above, provides access to external memory).

When the DSP module 16 is executing the VCMAG command, the DSP module 16 is ,isolated from the internal bus 20 so that the address generator 28 can retrieve operands for the VCMAG operation from the internal memory array 22 for both port Y and port D of the multiplier/accumulator 26. Isolation of the DSP module 16 in this manner allows the general purpose processor 18 to reference the external memory via the bus interface unit 24 to allow transfer of data and instructions between the general purpose processor 18 and external memory for simultaneous execution of a general purpose task.

Figure 9B:
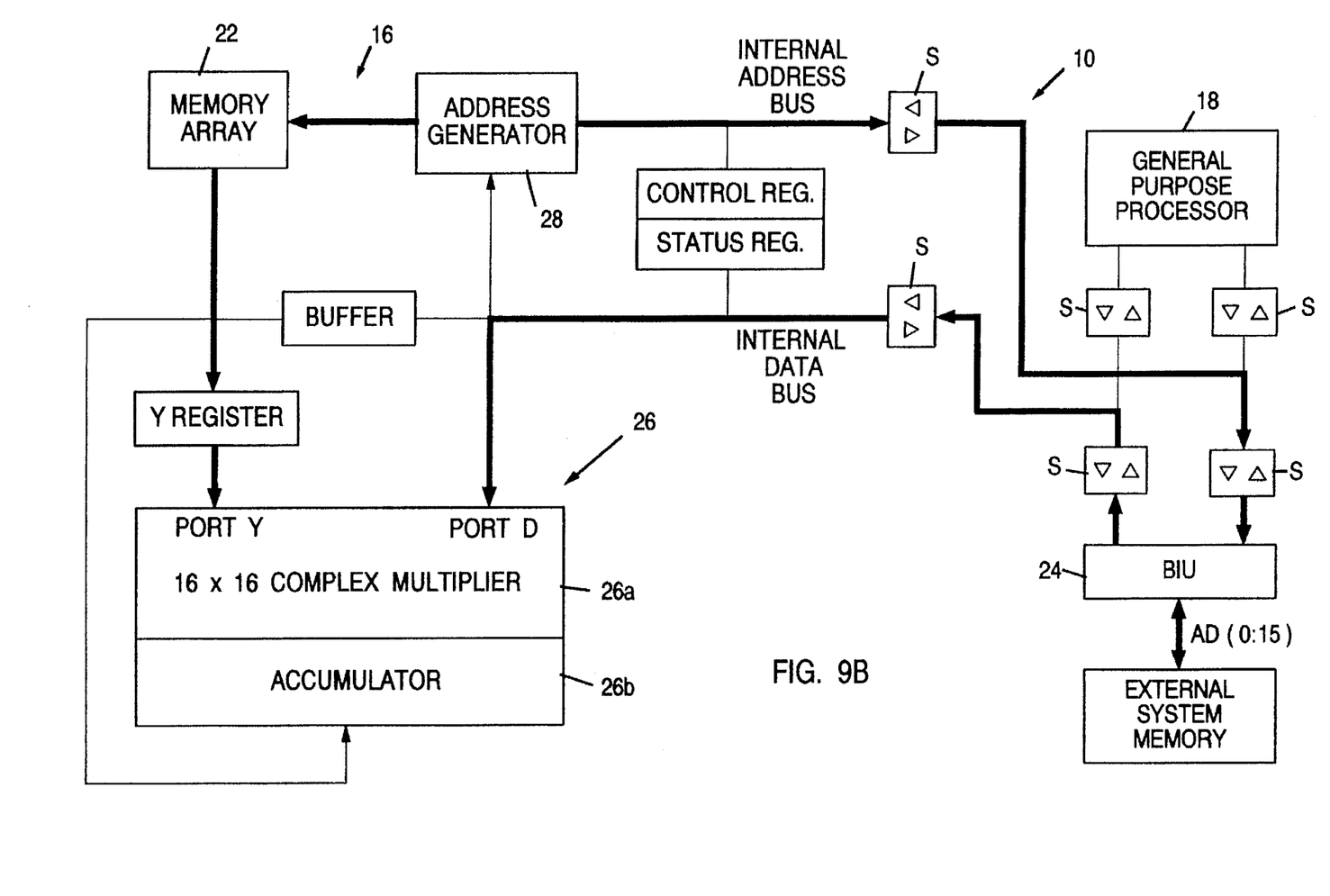
FIG. 9B is a block diagram illustrating an internal bus configuration of a data processing system in accordance with the present invention with the DSP module executing a VCMAD, VCMUL or VCMAC command, FIG. 9C a block diagram illustrating an internal bus configuration of a data processing system in accordance with the present invention with the general purpose processor executing a read or write to registers of the DSP module or to the internal memory array.

FIG. 9B illustrates the bus configuration during execution of the VCMAD, VCMUL or VCMAC commands by the DSP module 16. In this case, the address generator 28 references an operand stored in the memory array 22 which is then provided to the Y port of the multiplier/accumulator 26. The address generator 28 also references a location in external memory which provides the second operand to the D port of the multiplier/accumulator 26. The general purpose processor 18 is isolated from both the internal memory array 22 and external memory.

Figure 9C:
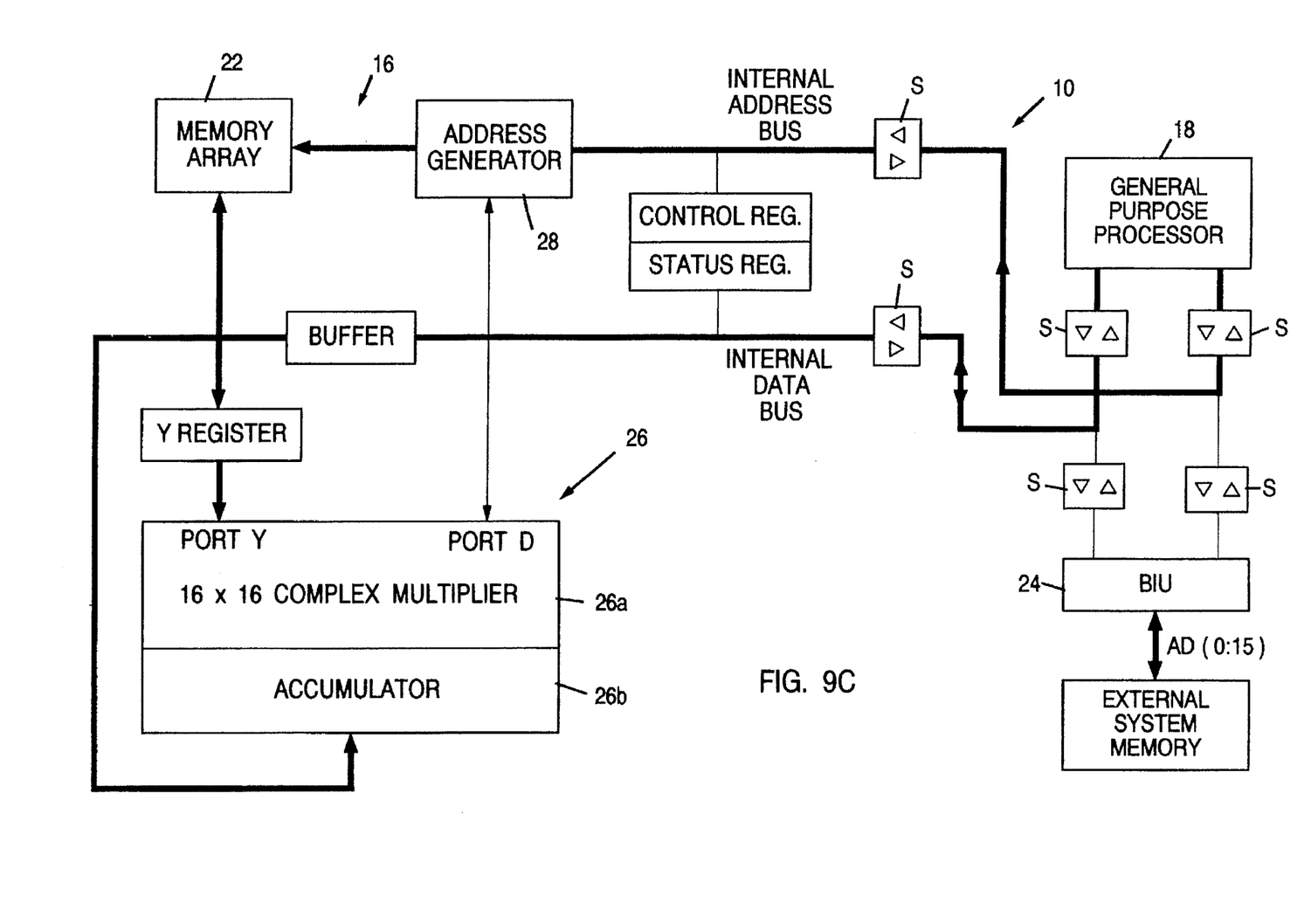

FIG. 9C illustrates read and write operations by the general purpose processor 18 either to the Y register or the accumulator register A or to the internal memory array 22 of the DSP module. As shown in FIG. 9C, in this case, the general purpose processor 18 references the selected storage element as memory mapped I/O via the internal address bus and either reads or writes to the selected storage element via the internal data bus.

Addition information regarding the present invention is provided in National Semiconductor Corporation's Advanced Data Sheet, NS32FX16, High Performance Fax Processor, which is provided as Appendix A at the end of this Detailed Description of the Invention.

It should be understood that various alternatives to the embodiments of the invention described herein may be employed in practicing the invention. It is intended that the following claims define the scope of the invention, that the structure and methods within the scope of these claims and their equivalence be covered thereby.

What is claimed is:

1. A data processing system for processing a digital signal, the data processing system comprising:

a shared bus for transferring both data and instructions;

a shared memory array for storing both data and general purpose instructions and that is connected for transfer of both data and general purpose instructions between the shared bus and the shared memory array;

a digital signal execution unit connected to the shared bus for processing the digital signal utilizing both data transferred between the shared memory array and the digital signal execution unit on the shared bus and a selected sequence of individual digital signal processor (DSP) instructions, the selected sequence of DSP instructions consisting of individual general purpose instructions transferred between the shared memory array and the digital signal execution unit on the shared bus; and a general purpose processor connected to the shared bus for controlling the digital signal execution unit by selecting each general purpose instruction to be transferred to the digital signal execution unit from the shared memory array whereby the selected sequence of individual DSP instructions executed by the digital signal execution unit is selectively configurable by the general purpose processor.

2. An integrated circuit data processing system for processing a digital signal, the data processing system comprising;

a shared internal bus for transferring both general purpose instructions and data;

a shared bus interface unit connected to the shared internal bus and connectable via a shared external bus to a shared external memory array via an external input/output port of the shared external memory array such that general purpose instructions and data stored in the shared external memory array may be transferred via external input/output port to be shared internal bus via the shared bus interface unit;

a digital signal execution unit connected to the shared internal bus for processing the digital signal utilizing both data transferred to the digital signal execution unit from the shared external memory array via the shared internal bus and a selected sequence of individual digital signal processor (DSP) instructions, the selected sequence of DSP instructions consisting of individual general purpose instructions transferred to the digital signal execution unit from the shared external memory array via the shared internal bus; and a general purpose processor connected to the shared internal bus for controlling the digital signal execution unit by selecting each of the general purpose instructions to be transferred to the digital signal execution unit from shared external memory array via the shared internal bus whereby the selected sequence of individual DSP instructions executed by the digital signal execution unit is selectively configurable by the general purpose processor.

3. An integrated circuit data processing system as in claim 2 and further comprising a shared internal memory array connected to the shared internal bus via an internal input/output port of the shared internal memory array such that general purpose instructions and data stored in the shared internal memory are transferrable via the internal input/output port of the shared internal memory array to the shared internal bus for transfer to either the digital signal execution unit or the general purpose processor whereby the selected sequence of individual DSP instructions executed by the digital signal execution unit is selectively configurable by the general purpose processor selecting individual general purpose instructions from the shared external memory and/or the shared internal memory.

4. A data processing system for processing a digital signal, the data processing system comprising:

a shared bus for transferring both data operands and general purpose instructions;

a shared memory array for storing both data operands and general purpose instructions and that is connected for transfer of data operands and general purpose instructions between the shared bus and the shared memory array;

a digital signal execution unit connected to the shared bus for processing the digital signal utilizing data operands transferred from the shared memory array to the digital signal execution unit on the shared bus and a selected sequence of individual digital signal processor (DSP) instructions, the selected sequence of DSP instructions consisting of individual general purpose instructions transferred from the shared memory array to the digital signal execution unit on the shared bus; and a general purpose processor connected to the shared bus for controlling the digital signal execution unit by selecting each general purpose instruction to be transferred to the digital signal execution unit from the shared memory array; and wherein the digital signal execution unit includes a control register connected to the shared bus for storing a general purpose instruction transferred to the digital signal execution unit by the general purpose processor from the shared memory array on the shared bus;

a multiply/accumulate unit that responds to storage of said general purpose instruction in the control register by initiating execution of a DSP operation corresponding to said general purpose instruction; and a DSP address generator connected to the shared bus for retrieving a first data operand stored in the shared memory and utilizable by the multiply/accumulate unit in executing said DSP operation.

5. A data processing system as in claim 4 wherein the multiply/accumulate unit includes first and second input ports for receiving said first data operand and a second data operand respectively, for utilization by the multiply/accumulate unit in executing said DSP operation.

6. A data processing system as in claim 5 wherein the address generator includes means for retrieving both said first data operand and said second data operand from the shared memory array via the shared bus.

7. An integrated circuit data processing system for processing a digital signal, the data processing system comprising:

(a) a digital signal execution unit that recovers digital data from the digital signal by executing a selected sequence of digital signal processor (DSP) instructions;

(b) a general purpose processor that selects the sequence of DSP instructions for execution by the digital signal execution unit from a set of DSP instructions and that performs general purpose processing tasks by executing general purpose instructionsons utilizing selected data;

(c) a shared internal bus for transferring both data and instructions and to which both the digital signal execution unit and the general purpose processor are connected; and (d) a shared internal memory array connected to the shared internal bus via an internal input/output port of the shared internal memory array such that the shared internal memory array is accessible by the digital signal execution unit via the internal input/output port for transferring operands utilizable by the digital signal execution unit between the shared internal memory array and the digital signal execution unit on the shared internal bus and such that the shared internal memory array is accessible by the general purpose processor via the internal input/output port for transferring the general purpose instructions and the selected data between the shared internal memory array and the general purpose processor on the shared internal bus; and (e) a shared bus interface unit connected between the shared internal bus and a shared external system memory that stores operands, instructions and data for implementing the transfer of operands, instructions and data between the shared internal bus and the shared external system memory such that the digital signal execution unit and the general purpose processor may access either the shared internal memory via the internal input/output port of the shared internal memory or the shared external memory system via the shared bus interface unit.

8. A data processing system as in claim 7 wherein the digital signal execution unit includes an internal address generator for retrieving operands from either the shared internal memory array or the external memory system via the shared internal bus for use by the digital signal execution unit in executing the selected sequence of DSP instructions.

9. An integrated circuit data processing system for processing a digital signal, the data processing system comprising:

(a) a digital signal execution unit that recovers digital data from the digital signal by executing a selected sequence of digital signal processor (DSP) instructions;

(b) a general purpose processor that selects the sequence of DSP instructions for execution by the digital signal execution unit from a set of DSP instructions and that performs general purpose processing tasks by executing general purpose instructions utilizing selected data;

(c) a shared internal bus for transferring both data and instructions and to which both the digital signal execution unit and the general purpose processor are connected; and (d) a shared internal memory array connected to the shared internal bus via an internal input/output port of the shared internal memory array such that the shared internal memory array is accessible by the digital signal execution unit via the internal input/output port for transferring operands utilizable by the digital signal execution unit between the shared internal memory array and the digital signal execution unit on the shared internal bus and such that the shared internal memory array is accessible by the general purpose processor via the internal input/output port for transferring the general purpose instructions and the selected data between the shared internal memory array and the general purpose processor on the shared internal bus;

wherein the digital signal execution unit includes an internal address generator for retrieving operands from the shared internal memory array via the shared internal bus for use by the digital signal execution unit in executing the selected sequence of DSP instructions.

10. An integrated circuit data processing system for processing a digital signal, the data processing system comprising:

(a) a digital signal execution unit that recovers digital data from the digital signal by executing a selected sequence of digital signal processor (DSP) instructions;

(b) a general purpose processor that selects the sequence of DSP instructions for execution by the digital signal execution unit from a set of DSP instructions and that performs general purpose processing tasks by executing general purpose instructions utilizing selected data;

(c) a shared internal bus for transferring both data and instructions and to which both the digital signal execution unit and the general purpose processor are connected;

(d) a shared internal memory array connected to the shared internal bus via an internal input/output port of the shared internal memory array such that the shared internal memory array is accessible by the digital signal execution unit via the internal input/output port for transferring operands utilizable by the digital signal execution unit between the shared internal memory array and the digital signal execution unit on the shared internal bus and such that the shared internal memory array is accessible by the general purpose processor via the internal input/output port for transferring the general purpose instructions and the selected data between the shared internal memory array and the general purpose processor on the shared internal bus;

wherein the DSP instructions and the general purpose instructions comprise subsets of a single instruction set executable by the data processing system; and (e) an instruction sequencing unit connected to the shared internal bus for controlling the flow of execution of the DSP instructions and the general purpose instructions.

* * * * *